US012543290B2

(12) United States Patent
Ku et al.

(10) Patent No.: US 12,543,290 B2
(45) Date of Patent: Feb. 3, 2026

(54) HEAT EXCHANGE APPARATUS AND METHODS FOR HYPERBARIC COOLING FAN APPLICATIONS

(71) Applicant: Intel Corporation, Santa Clara, CA (US)

(72) Inventors: Jeff Ku, Taipei (TW); Chi Chou Cheng, Taoyuan (TW); Jeffrey Ho, New Taipei (TW); Chih-Tsung Hu, New Taipei (TW); Srinivasarao Konakalla, Bangalore (IN); Tsung-Kai Lin, New Taipei (TW); Arnab Sen, Whitefield (IN); Chiu-Chun Wang, Taoyuan (TW); Jiacheng Wu, Taipei (TW)

(73) Assignee: Intel Corporation, Santa Clara, CA (US)

( * ) Notice: Subject to any disclaimer, the term of this patent is extended or adjusted under 35 U.S.C. 154(b) by 230 days.

(21) Appl. No.: 18/340,577

(22) Filed: Jun. 23, 2023

(65) Prior Publication Data

US 2024/0431066 A1    Dec. 26, 2024

(51) Int. Cl.
*H05K 7/20*     (2006.01)
*G06F 1/20*     (2006.01)

(52) U.S. Cl.
CPC ......... *H05K 7/20154* (2013.01); *G06F 1/203* (2013.01); *H05K 7/20172* (2013.01)

(58) Field of Classification Search
CPC ...................................................... G06F 1/203
See application file for complete search history.

(56) References Cited

U.S. PATENT DOCUMENTS 9,277,672 B2 *   3/2016   Hata ................ H05K 7/20154
2021/0096617 A1 *  4/2021   Liao ....................... G06F 1/203

* cited by examiner

*Primary Examiner* — Mukundbhai G Patel
(74) *Attorney, Agent, or Firm* — Alliance IP, LLC (57) ABSTRACT

Heat exchange apparatuses and methods for hyperbaric cooling fan applications such as computing devices. The apparatus comprises a material with high thermal conductivity and is configured to be overlaid on an internal surface of the housing, such that an internal surface of the apparatus is exposed to the hot air flowing inside the housing, and an external surface of the apparatus occludes at least some of the existing through-holes of the housing. In operation, the apparatus converts the through-holes into passive heat exchanging regions that passively transfer heat from inside the housing to outside the housing, which brings the internal air temperature and junction temperature (Tj) of the heat generating components down. Provided embodiments do not require reworking of the original industrial design (ID) of the housing.

20 Claims, 9 Drawing Sheets

HEAT EXCHANGE APPARATUS AND METHODS FOR HYPERBARIC COOLING FAN APPLICATIONS

BACKGROUND

The heat generated by some components, such as central processing units (CPUs) and graphics processing units (GPUs), presents a thermal management technical problem for the development of many consumer products. Proposed thermal management solutions include a variety of cooling fan applications and apparatus. However, continued improvements to thermal management for consumer products are desirable.

DETAILED DESCRIPTION

Many consumer products and devices have a chassis or motherboard that includes one or more components that generate an undesirable amount of heat (e.g., central processing units (CPUs) and graphics processing units (GPUs)). Mitigating this heat is a technical problem to solve, and this technical problem is further exacerbated in consumer devices with thin housings, because the heat generating components have very little space around them and can create a region of stagnated hot air which can cause a skin hot spot in the housing. The skin hot spot is measured as a skin temperature, and a variety of thermal management solutions have been proposed to mitigate the high skin temperature that can occur.

The housing may be embodied as a hard shell, to protect the components inside it, and as a first order thermal management solution, embodiments of the housing are generally perforated with a plurality of vents or through-holes, through which the hot air can escape and/or ambient air can enter. Many technical solutions implement a cooling fan in the housing to push the hot air outside of the housing and device, through the vents in the housing (this is sometimes referred to as evacuative flow architecture). The arrangement of through-holes as well as individual through-hole shape (essentially a grill design) is generally expected to improve the cooling fan operating point by increasing the open-air ratio on the D cover, especially in the area right above the cooling fan. However, even with the cooling fans running at full speed, hot chassis temperature is especially technically challenging for gaming and high-performance laptops, where temperatures can easily exceed the underwriter laboratories (UL) defined maximum temperature spec (<48° C.) for the housing.

Further variations on evacuative flow architectures, such as running the cooling fan at a faster speed, using a bigger cooling fan, using multiple cooling fans, adding even more vents, and building fan impellers with blade variations can offer improvements, but each bring their own drawback. For example, faster fans generally cause more noise, bigger and/or more fans can require an unacceptable amount of real estate in the housing, additional perforations in the housing can make the housing undesirably weak, etc. In practice, many original equipment manufacturers (OEMs) employ a skin hot-spot temperature measurement waiver; as a common rule, the area in the housing with the through-holes is waived for skin temperature measurement. However, not measuring this area does not mean that the thermal issue is solved.

Another thermal management solution for consumer devices implements a hyperbaric cooling fan. A hyperbaric cooling fan is housed in its own casing and configured to pull ambient air in, pressurize the air and push the pressurized air through an egress/output in its casing. Unlike the evacuative flow architecture described above, in the hyperbaric cooling fan application, ambient air is pulled in and pressurized air is pushed across the heat generating components in the chassis, resulting in heated air. The pressurized environment around the chassis causes the heated air to be channeled as airflow and pushed outside of the housing through an exit vent; in some embodiments, the exit vent may be located on a sidewall of the housing. Accordingly, the housing for a hyperbaric cooling fan application generally has fewer through-holes than the housing for the evacuative flow architecture; it has the intake air vents and an exit vent. Fewer perforations or through-holes advantageously enable the housing to be sturdier. Hyperbaric cooling fan applications can also provide quieter laptops because the hyperbaric cooling fan can run at lower speeds to achieve required chassis cooling than the evacuative flow architectures described above.

Given the advantages of hyperbaric cooling fan applications, there may be some scenarios in which it is desirable to convert the thermal design of an existing laptop or other consumer device from an evacuative flow architecture to a hyperbaric cooling fan application. However, in addition to swapping out the fan assembly, the mismatch of the number of vents and location of vents presents a technical challenge, especially at scale.

To put this technical challenge into context, the industrial design (ID) of the housing (also referred to as a case) often includes a C cover with a keyboard attached to a D cover that generally includes the vents. The ID of the housing may visually communicate the original equipment manufacturer (OEM) of the device. For a given OEM, the ID of the D cover may include variations in the shape and wall thickness of the D cover, as well as patterns or arrangements of a plurality of vents or through holes. Therefore, a robust conversion solution that can adapt to a variety of IDs is desirable.

Aspects of the present disclosure provide a technical solution to this technical problem and other related enhancements, in the form of heat exchange apparatuses and methods for hyperbaric cooling fan applications. Various embodiments include a heat exchange apparatus that is actively heated up by hot air inside the housing and passively dissipates the heat to the outside of the housing. The heat exchange apparatus may be considered contactless, in that it does not contact the heat generating component(s), which contrasts with thermal management solutions such as heat pipes, vapor chambers, and the like.

Provided embodiments advantageously utilize the original ID of the housing. The provided heat exchange apparatus comprises a material with high thermal conductivity (such as copper, aluminum, or the like). The heat exchange apparatus is configured to be overlaid on an internal surface of the D cover, such that an internal surface is exposed to the hot air flowing inside the housing, and an external surface occludes at least some of the existing through-holes. In operation, the heat exchange apparatus converts the through-holes into passive heat exchanging regions capable of passively transferring heat from inside the housing to outside the housing, which brings the internal air temperature and junction temperature (Tj) of the heat generating components down. The amount of Tj reduction is related to the exposed surface area of the heat exchange apparatus, which is in turn a function of the original ID (e.g., vent sizing, location, etc.). Aspects of the present disclosure can be applied to various computing devices (such as, but not limited to, laptop computers, desktop computers, kiosks, and phones) designed by various OEMs.

Embodiments can be detected with a visual inspection of the housing of the computing device, and in particular, of the D cover, to look for the heat exchange apparatus disclosed herein. A more detailed description of the aspects of the present disclosure follows a terminology section.

Terminology

As used herein, a "computing system" or "compute device" refers to any of a variety of computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a collocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

As used herein, the terms "processor unit", "processing unit" or "processor" may refer to any device or portion of a device that processes electronic data from registers and/or memory to transform that electronic data into other electronic data that may be stored in registers and/or memory. A processor unit may be a system-on-a-chip (SOC), and/or include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

Terms or values modified by the word "substantially" include arrangements, orientations, spacings, or positions that vary by plus or minus 20% (inclusive) from the meaning of the unmodified term or value. Terms or values modified by the word "about" include values that vary by plus or minus 10% (inclusive) from the meaning of the unmodified term or value.

As used herein, "overlaid," conveys a positional relationship, agnostic to a method of application. In other words, if layer A is overlaid on element B, in a cross-sectional view, layer A would appear as a veneer on element B, and in a top-down view, layer A would appear superimposed on element B.

Description of Aspects of the Present Disclosure

Example embodiments are hereinafter described in conjunction with the following drawing figures, wherein like numerals denote like elements. Figures are not necessarily to scale. As may be appreciated, certain terminology, such as "upper,", "uppermost", "lower," "above," "below," "bottom," and "top" refer to directions based on viewing the Figures to which reference is made. Further, terms such as "front," "back," "rear,", "side", "vertical", and "horizontal" may describe an orientation and/or location within a consistent but arbitrary frame of reference which is made clear by reference to the text and the associated Figures describing the component under discussion. Such terminology may include the words specifically mentioned above, derivatives thereof, and words of similar import. For the sake of brevity, well-known structures and devices may be shown in block diagram form to facilitate a description thereof.

Figure 1:
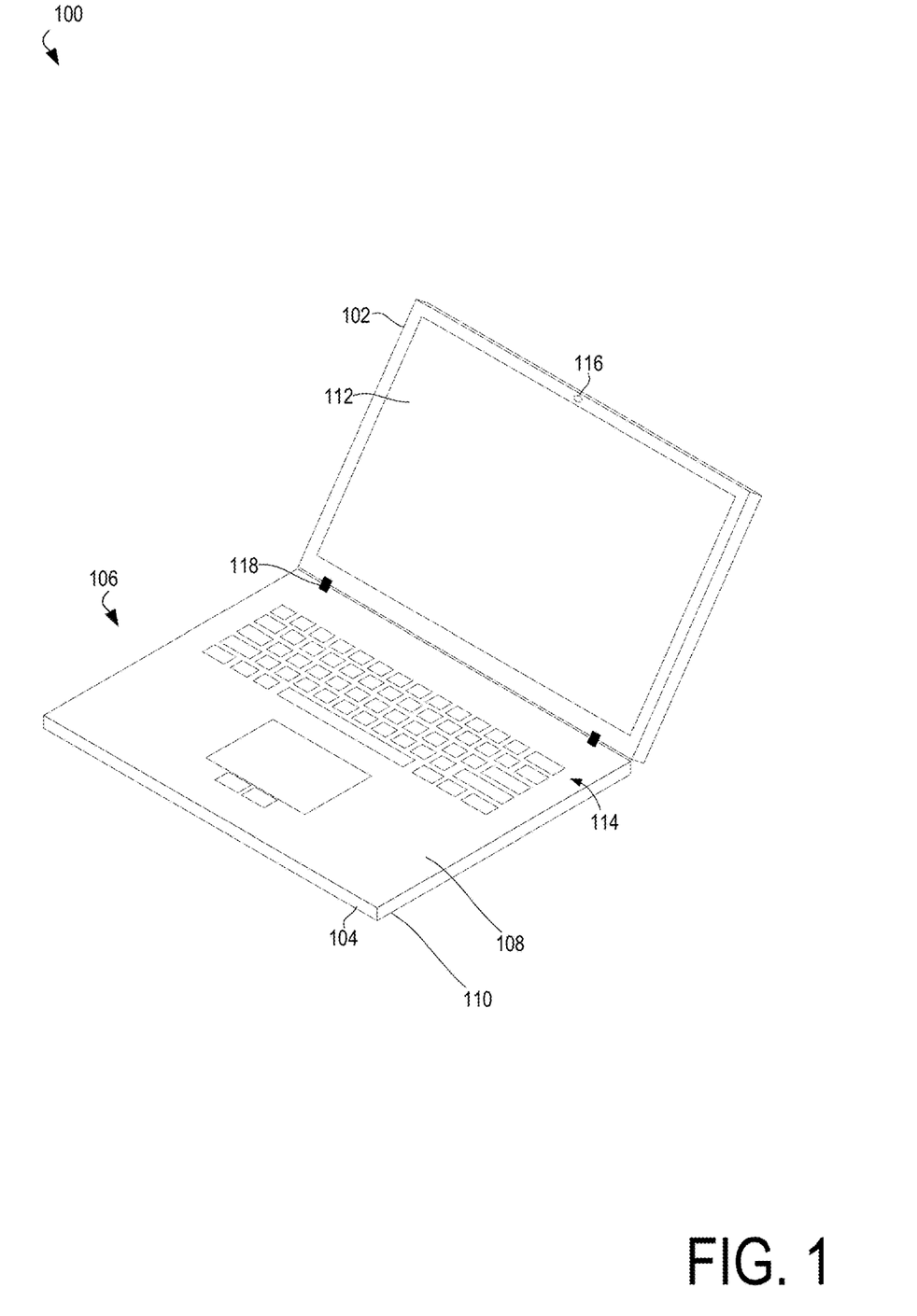
FIG. 1 is an illustration of an exemplary consumer product in which embodiments of the heat exchange apparatus may be implemented.

Embodiments of the heat exchange apparatus may be implemented in a variety of consumer products and computing devices. In FIG. 1 an exemplary computing device 100 is embodied as a laptop computer. The computing device 100 includes a housing comprising a lid portion 102 and a base portion 104. The lid portion 102 includes a display 112, and the base portion 104 includes a keyboard 114. The illustrative computing device 100 is embodied as a laptop with a clamshell configuration with one or more hinges 118 joining the base portion 104 and the lid portion 102. Accordingly, computing device 100 can be in an open configuration (shown in FIG. 1) or a closed configuration, in which the lid portion 102 is positioned on top of the base portion 104 with the display 112 facing downwards above the keyboard on the base portion 104 (e.g., see FIG. 2). Other variations of the computing device 100 may include a display that can rotate up to 360°, allowing the computing device 100 to be in a book configuration, a tablet configuration, or the like. The computing device 100 may be a 2-in-1 device, with a lid portion 102 that can separate from the base portion 104. Moreover, the computing device 100 may embody a single housing without hinges 118.

The display 112 may be any suitable size and/or resolution, such as a 5-18-inch display, with a resolution from 340×480 to 3820×2400. The display 112 may use any suitable display technology, such as LED, OLED, QD-LED, electronic paper display, and may be a touchscreen display. The lid portion 102 may also include a camera 116. The camera 116 may include one or more fixed or adjustable lenses and one or more image sensors. The image sensors may be any suitable type of image sensors, such as a CMOS or CCD image sensor. The camera 116 may have any suitable aperture, focal length, field of view, etc. For example, the camera 116 may have a field of view of 60-110° in the azimuthal and/or elevation directions. As may be appreciated, the computing device 100 may also be another portable or nonportable electronic device, such as a tablet, a desktop computer, a server computer, or the like.

The base portion 104 includes a housing 106 comprising an upper cover 108 attached to a lower cover 110. In various embodiments, the upper cover 108 is a C cover, comprising the keyboard 114, and the lower cover 110 is a D cover that includes a plurality of through-holes or vents. As mentioned above, the ID of the D cover can vary from OEM to OEM and across various makes and models of computing devices.

Figure 2:
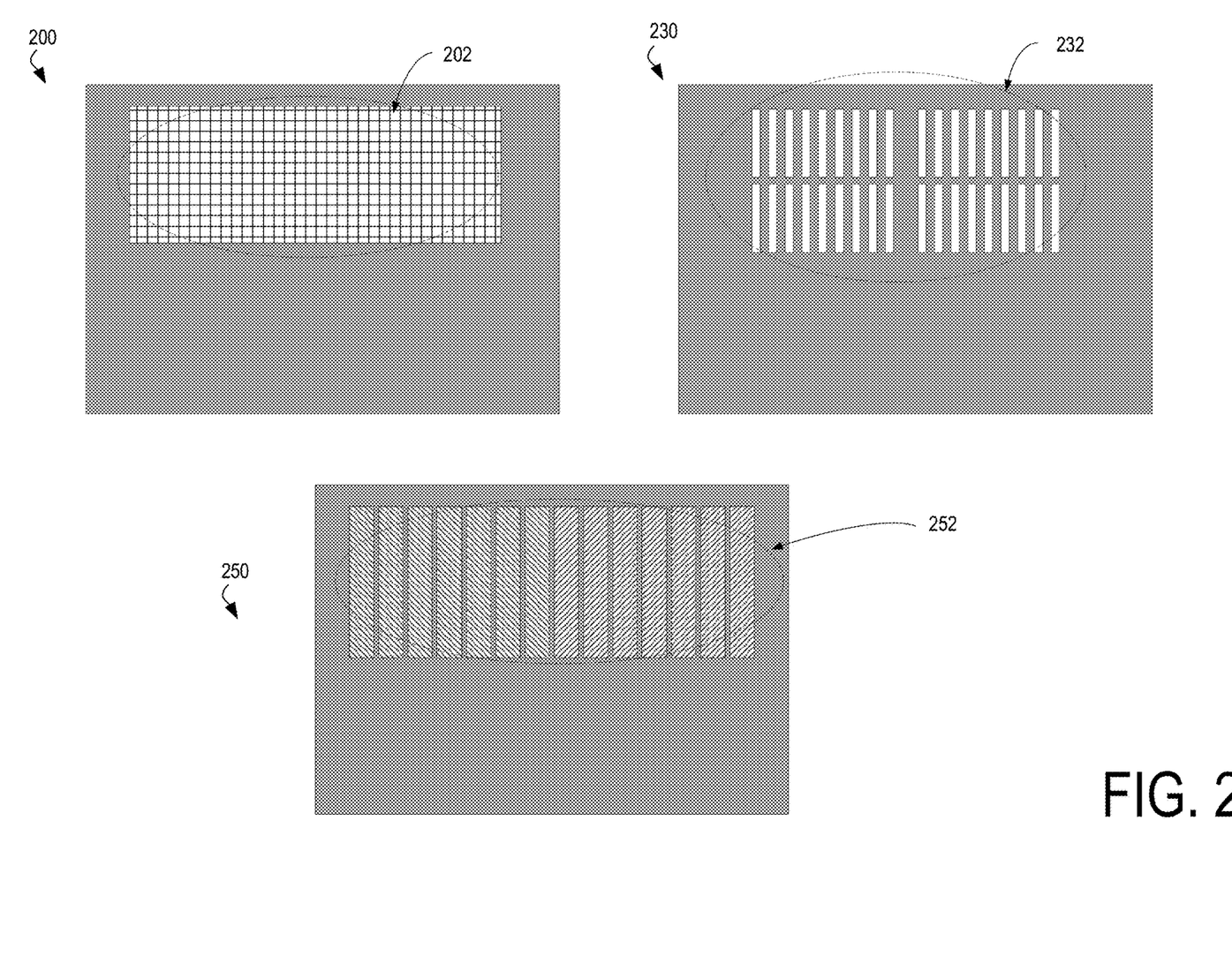
FIG. 2 provides exemplary D cover industrial designs for which embodiments of the present disclosure may be implemented.

Turning the laptop device upside down, one can view the external surface of the D cover, or lower cover 110. FIG. 2 provides some non-limiting examples of D cover IDs. In D cover 200, a plurality of through-holes is in a first arrangement 202 across a portion of the surface of the D cover 200. In D cover 230, a plurality of through-holes is in a second arrangement 232 across a portion of the surface of the D cover 230. In D cover 250, a plurality of through-holes is in a third arrangement 252 across a portion of the surface of the D cover 250. Note that in each of the examples, the arrangements of through-holes (i.e., vents) extend across about 20 percent to about 50 percent of the entire surface of the D cover. Additionally, the through-holes can have a variety of shapes, such as rectangles, squares, diagonals, and the like, and may be arranged in a grid, in columns, or in another pattern. The arrangement of through-holes as well as individual through-hole shape (essentially rectangular vents arranged as a grill design) may be OEM or make and model specific.

Figure 3:
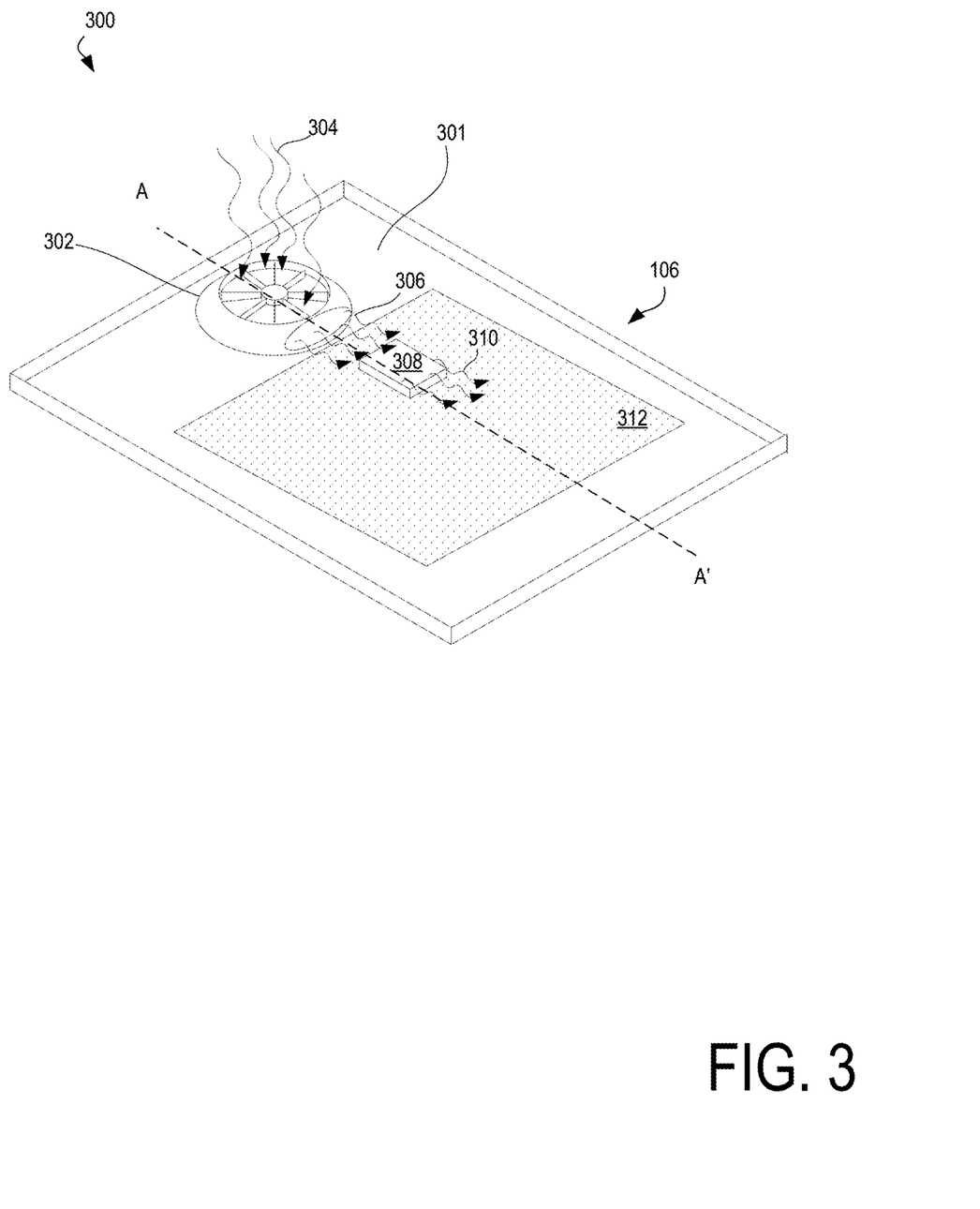
FIG. 3 is a perspective view showing a hyperbaric cooling fan application, in accordance with various embodiments.
Figure 4A:
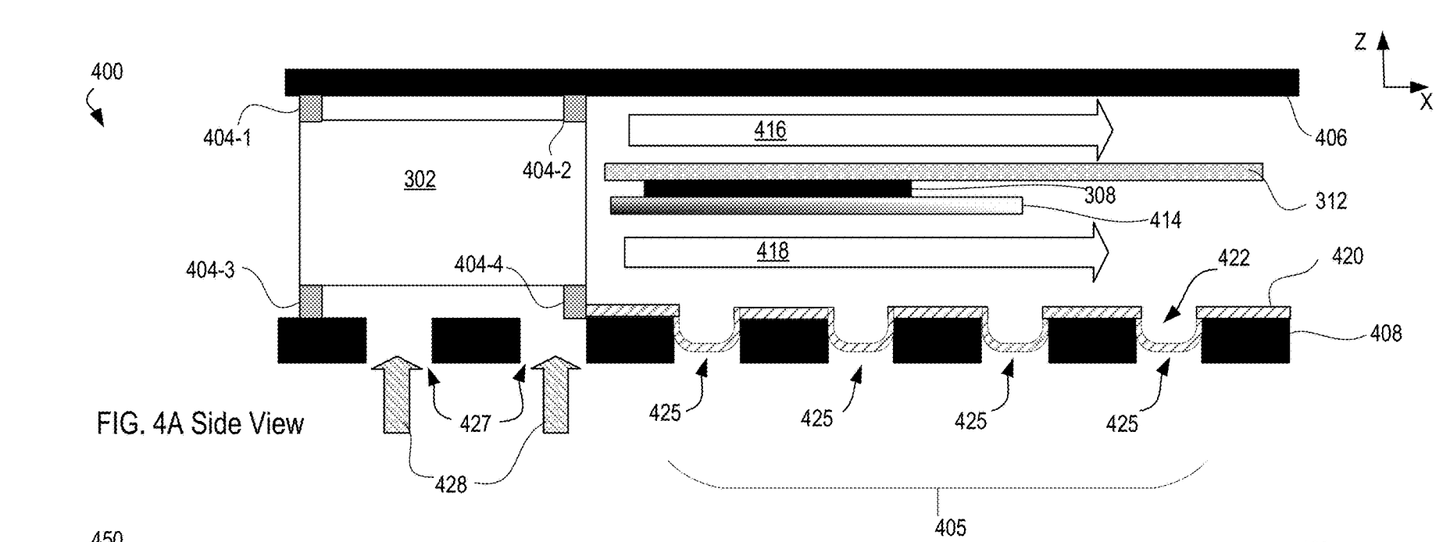
FIGS. 4A and 4B are simplified side views showing exemplary embodiments of a heat exchange apparatus in the hyperbaric cooling fan application.
Figure 4B:
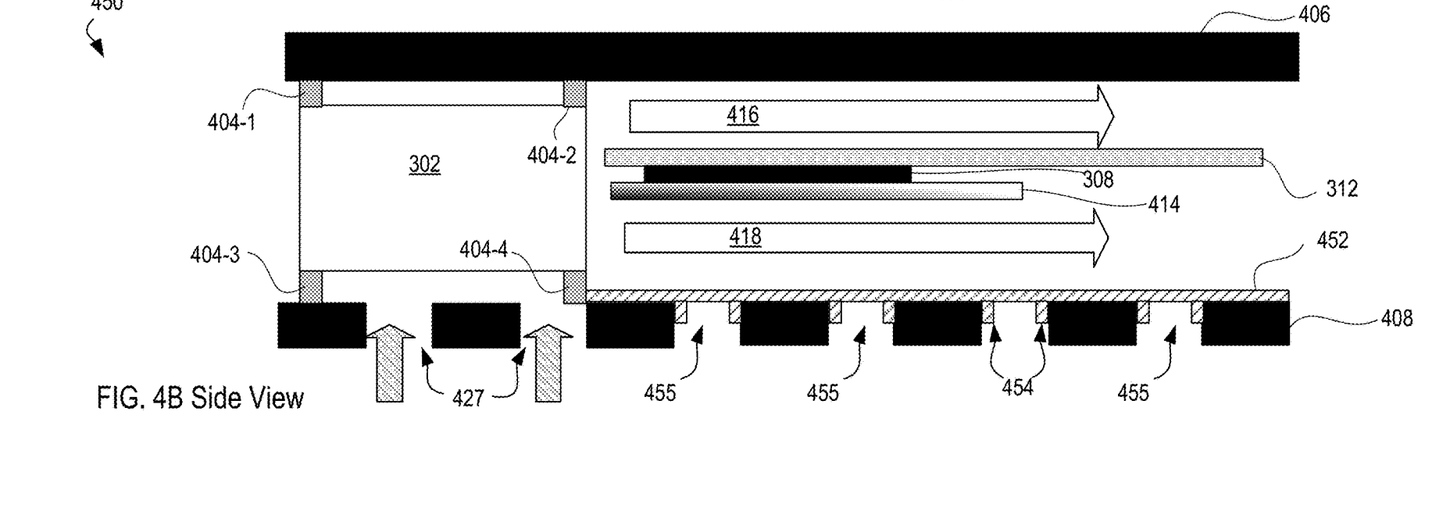

Turning now to FIGS. 3, 4A, and 4B, with continued reference to FIGS. 1 and 2. View 300 in FIG. 3 is a simplified illustration of the underside of the housing 106 (i.e., the laptop is still upside down), with the D cover (200, 230, 250) or lower cover removed. A volume 301 represents the inside of the housing 106. A motherboard 312 is located within the housing 106 (upper cover 406 and lower cover 408) positioned over a first subset 405 of the plurality of through-holes. A fan assembly 302 is located within the housing 106 and positioned over a second subset (through-holes 427) of the plurality of through-holes, wherein the fan assembly 302 is configured to pull ambient air 304 (and ambient air 428) into the housing and push air 306 across the motherboard 312. The motherboard 312 has attached thereto at least one heat generating component 308, such as a CPU or GPU. The air 306 gets heated by the heat generating component 308, thereby creating hot air 310. In various embodiments, the pressurized air (push air 306) comprises air 416 pushed above the motherboard 312, as well as air 418 pushed below the motherboard 312.

The fan assembly 302 may be attached to the housing with gaskets 404 to support a pressurized compartment or sealed chamber. The gaskets 404 are illustrated as four discrete gaskets 404-1, 404-2, 404-3, and 404-4, however, in other embodiments, the gasket may appear more like a ring or continuous adhesive around a perimeter of the fan assembly 302.

An optional thermal management component 414 may be attached to the heat generating component 308 on the motherboard 312; the optional thermal management component 414 could be a vapor chamber, heat pipe, or other similar component.

Aspects of the present disclosure introduce heat exchange apparatuses. Non-limiting example embodiments include heat exchange component 420 and heat exchange component 452. The heat exchange component is located on an internal surface of the lower cover 408, as illustrated. The heat exchange component (420, 452) is configured to occlude the first subset 405 of the plurality of through-holes.

The heat exchange component (420, 452) can comprise one or more of various high thermal conductivity materials. In an embodiment, the heat exchange component (420, 452) comprises copper. In another embodiment, the heat exchange component (420, 452) comprises aluminum. In an embodiment, the heat exchange component (420, 452) comprises copper with a thickness of about 0.05 millimeters (mm).

In an exemplary method for making the heat exchange component, the lower cover ID is identified, and based on the lower cover ID, the vents are mapped out to create a heat exchange component that mates with the lower cover such that divots or fins/protrusions are aligned with respective vents as shown in the figures. In various aspects of the invention, the heat exchange component (420, 452) can be manufactured by different processes. Non-limiting examples of processes include chemical etching, mechanical stamping, or the forming of a flexible foil. More specifically, exemplary methods determine the number of vents, the vent size(s), the locations of the vents, and the orientation of the vents. Exemplary methods obtain a sheet of conductive material and proceed to chemically etch, mechanically stamp, or otherwise form the conductive material such that it will exhibit features as described herein and mate with the lower cover. Once completed, the heat exchange component is placed and attached to the lower cover, as shown in the figures. The determination of the thermal conductivity material and the method/process of manufacture may be application-dependent, based upon the ID and mechanical requirements of the consumer device.

In FIG. 4A, the heat exchange component 420 may be stamped, creating divots 422 that fit into the vents or through-holes of the lower cover 408. Although view 400 is not to scale, it is intentional that the divots 422 do not extend past an external surface of the lower cover 408, such that the regions of heat exchange 425 do not contact a user's skin when the computing device is being held. Said differently, the divots 422 completely occlude but only partially fill the (volume of the) respective vents. Using a stamping process may result in a substantially uniform thickness heat exchange component 420 that may be very affordable compared to other solutions.

In FIG. 4B, the heat exchange component 452 may be chemically etched copper or chemically etched aluminum. Using a chemical etch process, embodiments may include protrusions 454 or fin features that extend substantially perpendicular to a base plane of the heat exchange component 452, as illustrated. The addition of protrusions 454 increases the total surface area of the heat exchange component 452. Like the above, although view 450 is not to scale, it is intentional that any protrusions 454 do not extend past an external surface of the lower cover 408, such that the regions of heat exchange 455 do not contact a user's skin when the computing device is being held.

Figure 5A:
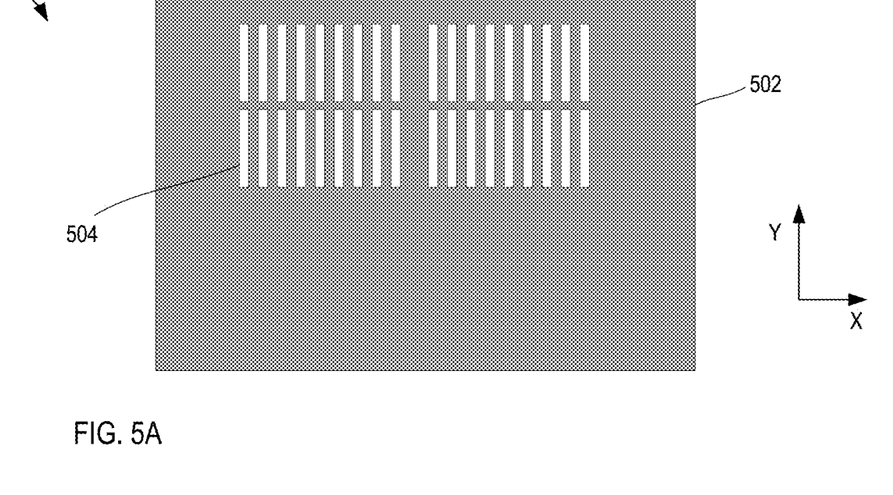
FIGS. 5A, 5B, and 5C are simplified top-down views of vents in a D cover for discussion of additional embodiments of the present disclosure.

As illustrated in FIG. 4A and FIG. 4B, the heat exchange component includes at least one heat exchange portion configured to occlude and partially fill a respective through-hole or vent. Using a chemical etch process may enable production of a heat exchange component 452 with a non-uniform thickness, possibly with a higher accuracy. In addition, using a chemical etch process can enable creation of more complicated features in the heat exchange portion (the portion configured to occlude and partially fill the vent) than what can be produced with the above stamping process. Top-down views in FIGS. 5A, 5B, 5C, and the cross-sectional side view in FIG. 6 provide non-limiting examples to illustrate this concept.

View 500 is a simplified bottom/external surface of a D cover 502 comprising vents 504. In various embodiments, the heat exchange component may further comprise an industrial design that, for a respective through-hole, occludes the hole with a textured region. The textured region may include various arrangements of fins or other etched or stamped shapes.

Figure 5B:
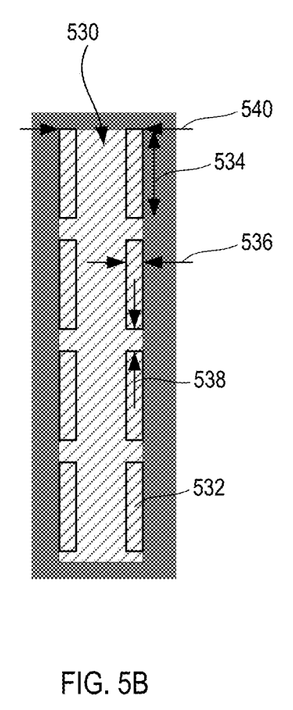
Figure 6:
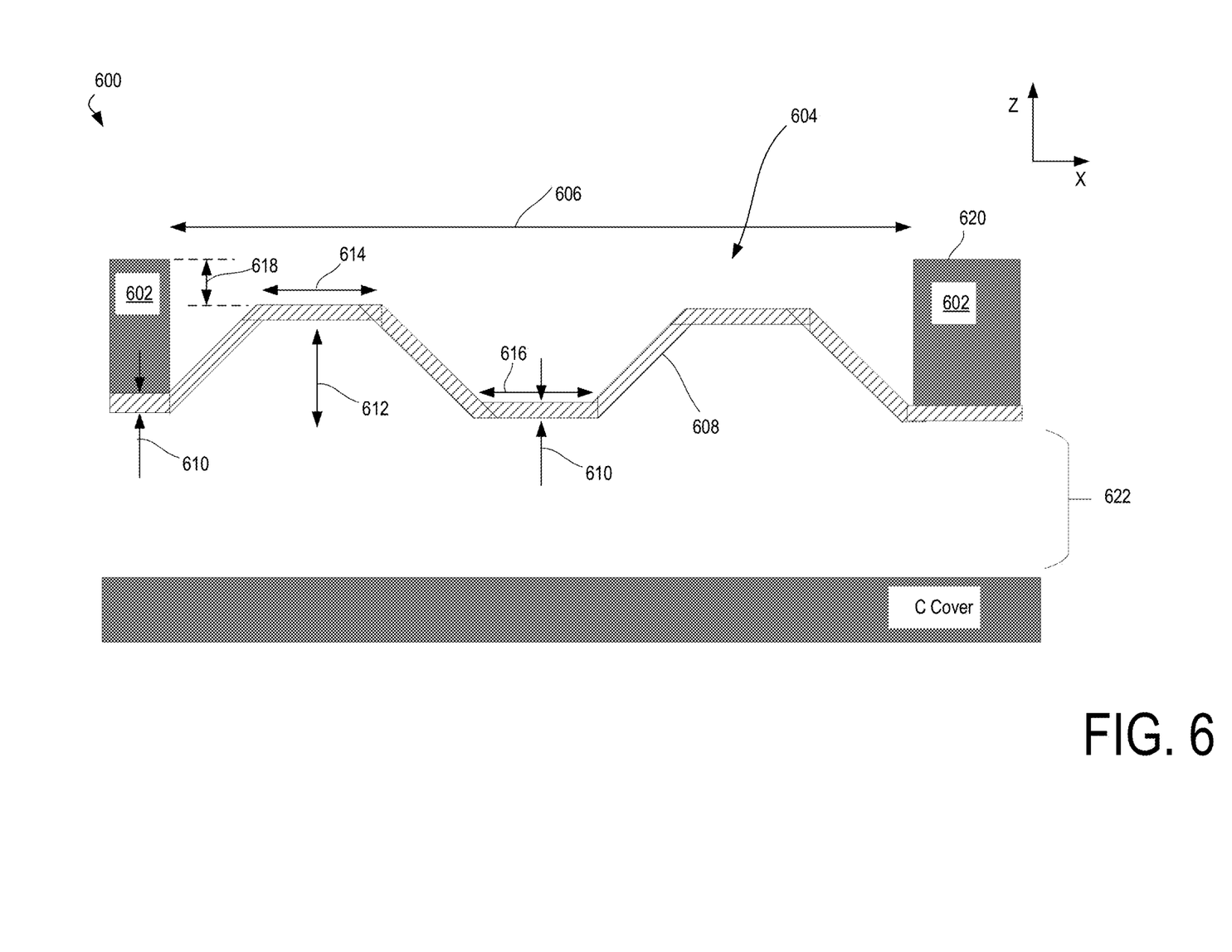
FIG. 6 illustrates another embodiments of the present disclosure.

In FIG. 5B, the industrial design of the heat exchange portion 530 of a heat exchange component may comprise a textured region with a plurality of fins 532 positioned to be located around a perimeter of the 504 or through-hole, individual fins 532 having length 534 and width 536, the fins 532 being spaced apart from each other by gap 538, the vent width 540. As may be appreciated, this design may be replicated across all relevant vents in the D cover. In an embodiment, the fins 532 may be about 03 mm wide and about 1.1 mm long, separated by a gap of 0.2 mm.

Figure 5C:
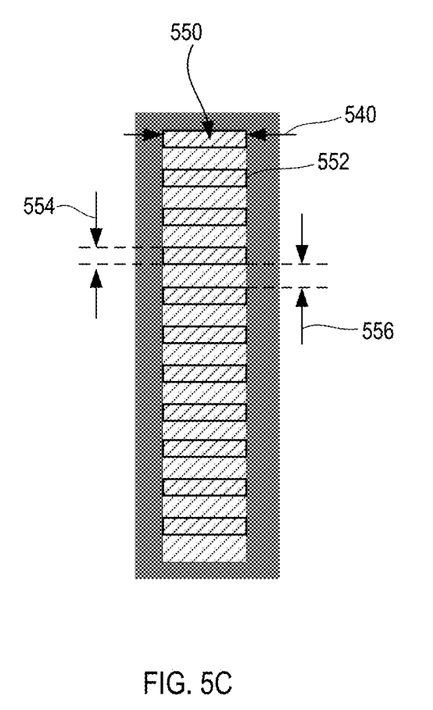

In FIG. 5C, the industrial design of the heat exchange portion 550 of a heat exchange component may comprise a textured region with a plurality of fins 552 positioned to be located across the width of the vent 504 or through-hole (fin length is substantially equal to vent width 540), individual fins 552 having width 554, the fins 552 being spaced apart from each other by gap 556. As may be appreciated, this design may be replicated across all relevant vents in the D cover. In an example embodiment, fins 552 have length of about 1.8 mm and thickness of about 0.3 mm, and the gap 556 is 0.2 mm.

In FIG. 6, view 600 is a side view that depicts the D cover 602 with a vent 604 represented by vent width 606, having the heat exchange portion 608 of the heat exchange apparatus therein. The heat exchange portion 608 has an industrial design that includes a textured region for a designated vent or through-hole. For example, the heat exchange portion 608 has a base thickness 610 and a repeating beveled shape to increase surface area, the beveled shape defined by substantially planar peaks of width 614 followed by substantially planar troughs of width 616. The beveled shape is a non-limiting example of a textured area designated for a through-hole. The peaks have height 612, which is less than an overall D cover thickness, such that there is still a gap 618 between an external surface 620 of the D cover 602 and the peaks of the heat exchange portion 608 of the heat exchange apparatus, for reasons described hereinabove. The C cover is indicated as being a distance 622 away from the heat exchange component, an area/region in which the components of a device may be located. As may be appreciated, this industrial design, or any of the other embodiments described above, may be replicated across all relevant vents in the D cover. In an embodiment, the base thickness is about 0.1 mm, the peak width is about 0.2 mm, the trough width is about 0.2 mm, and the peak height is about 0.2 mm.

In FIGS. 5B, 5C, and 6, the heat exchange component may be considered a means for heat exchange. The means for heat exchange includes at least one heat exchange portion configured to occlude and partially fill a respective through-hole or vent. The means for heat exchange may include a textured region for a designated vent or through-hole.

As mentioned above, in operation, the heat exchange apparatus (and means for heat exchange) converts the through-holes into passive heat exchanging regions by occluding them with the thermally conductive material capable of passively transferring heat from inside the housing to outside the housing. This passive heat transfer brings down the internal (the volume 301 inside the housing) air temperature and the junction temperature (Tj) of the heat generating components. The amount of Tj reduction is related to the exposed surface area of the heat exchange apparatus, which is in turn a function of the original ID (e.g., vent sizing, location, etc.). This solution works well (i.e., produces a larger Tj/Tgpu reduction) on plastic case or housing designs, because the relatively low thermal conductivity of plastic makes plastic unable to dissipate heat passively. During testing of embodiments, it has been demonstrated that the larger the percentage of surface area of heat exchange component that is exposed to the ambient air via the vents or through-holes, the more improved the thermal results have been.

As those with skill in the art will appreciate, the provided apparatus and methods may be scaled for computing devices with more than one hyperbaric cooling fan; for example, a second hyperbaric cooling fan can be placed in the housing and oriented to push air from a second direction, such that the pushed air (hot air) from the first and second hyperbaric cooling fan merge and move out of the housing via the same or nearby exit vents.

Thus, a heat exchange apparatus and methods for hyperbaric cooling fan applications have been provided. The following description illustrates various context for usage and application of provided aspects of the present disclosure.

Disclosed embodiments may be implemented in a compute node. In the simplified example depicted in FIG. 7, a compute node 700 includes a compute engine (referred to herein as "compute circuitry") 702, an input/output (I/O) subsystem 708, data storage 710, a communication circuitry subsystem 712, and, optionally, one or more peripheral devices 714. With respect to the present example, the compute node 700 or compute circuitry 702 may perform the operations and tasks attributed to the system. In other examples, respective compute nodes 700 may include other or additional components, such as those typically found in a computer (e.g., a display, peripheral devices, etc.). Additionally, in some examples, one or more of the illustrative components may be incorporated in, or otherwise form a portion of, another component.

Figure 7:
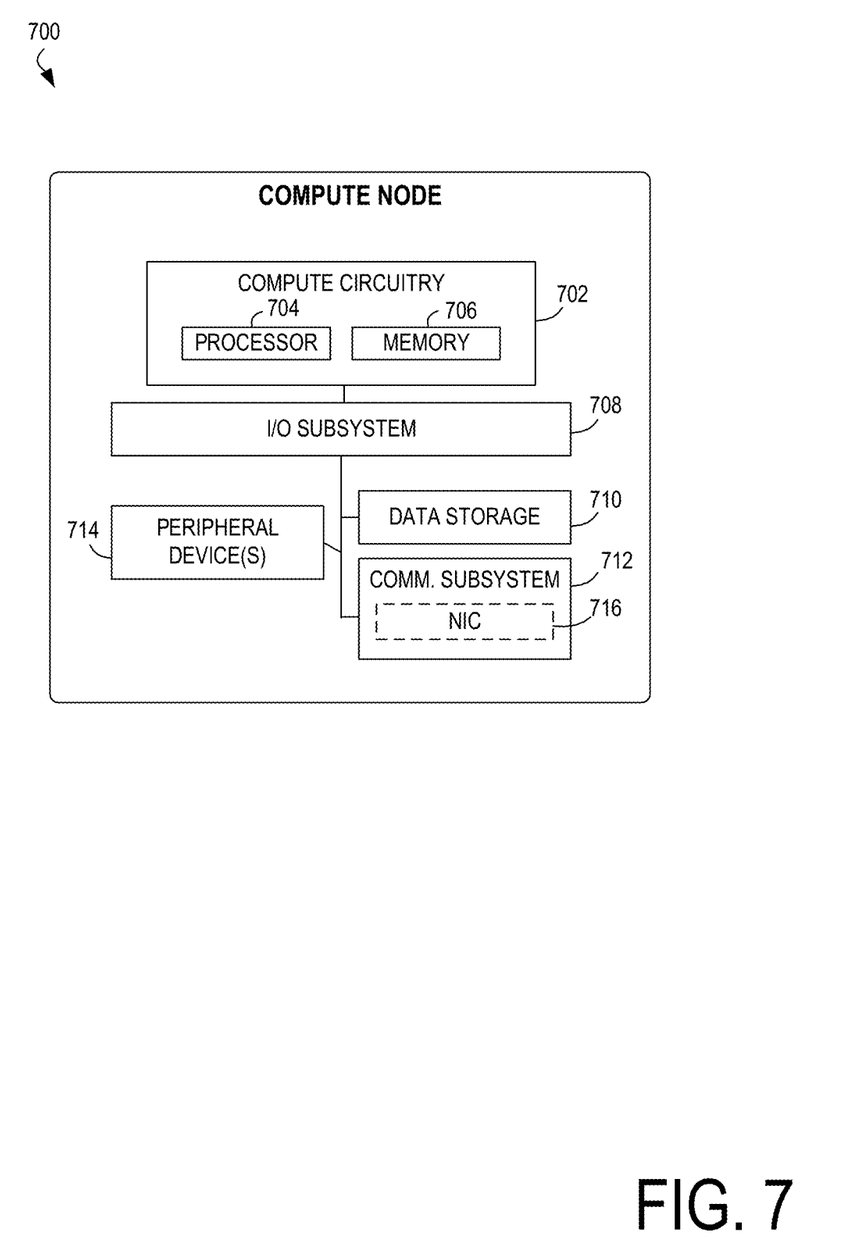
FIG. 7 is a block diagram of an example compute node that may include any of the embodiments disclosed herein.

In some examples, the compute node 700 may be embodied as a single device such as an integrated circuit, an embedded system, a field-programmable gate array (FPGA), a system-on-a-chip (SOC), or other integrated system or device. In the illustrative example, the compute node 700 includes or is embodied as a processor 704 and a memory 706. The processor 704 may be embodied as any type of processor capable of performing the functions described herein (e.g., executing compile functions and executing an application). For example, the processor 704 may be embodied as a multi-core processor(s), a microcontroller, a processing unit, a specialized or special purpose processing unit, or other processor or processing/controlling circuit.

In some examples, the processor 704 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 704 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing, or managing server or data center hardware, managing service meshes, or collecting and distributing telemetry), outside of the CPU or general-purpose processing hardware. However, it will be understood that a xPU, a SOC, a CPU, and other variations of the processor 704 may work in coordination with each other to execute many types of operations and instructions within and on behalf of the compute node 700.

The memory 706 may be embodied as any type of volatile (e.g., dynamic random-access memory (DRAM), etc.) or non-volatile memory or data storage capable of performing the functions described herein. Volatile memory may be a storage medium that requires power to maintain the state of data stored by the medium. Non-limiting examples of volatile memory may include various types of random-access memory (RAM), such as DRAM or static random-access memory (SRAM). One type of DRAM that may be used in a memory module is synchronous dynamic random-access memory (SDRAM).

In an example, the memory device is a block addressable memory device, such as those based on NAND or NOR technologies. A memory device may also include a three-dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 706 may be integrated into the processor 704. The memory 706 may store various software and data used during operation such as one or more applications, data operated on by the application(s), libraries, and drivers.

The compute circuitry 702 is communicatively coupled to other components of the compute node 700 via the I/O subsystem 708, which may be embodied as circuitry and/or components to facilitate input/output operations with the compute circuitry 702 (e.g., with the processor 704 and/or the main memory 706) and other components of the compute circuitry 702. For example, the I/O subsystem 708 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 708 may form a portion of a system-on-a-chip (SoC) and be incorporated, along with one or more of the processor 704, the memory 706, and other components of the compute circuitry 702, into the compute circuitry 702.

The one or more illustrative data storage devices 710 may be embodied as any type of devices configured for short-term or long-term storage of data such as, for example, memory devices and circuits, memory cards, hard disk drives, solid-state drives, or other data storage devices. Individual data storage devices 710 may include a system partition that stores data and firmware code for the data storage device 710. Individual data storage devices 710 may also include one or more operating system partitions that store data files and executables for operating systems depending on, for example, the type of compute node 700.

The communication subsystem 712 may be embodied as any communication circuit, device, transceiver circuit, or collection thereof, capable of enabling communications over a network between the compute circuitry 702 and another computing device (e.g., an edge gateway of an implementing edge computing system).

The communication subsystem 712 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra-mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication subsystem 712 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication subsystem 712 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication subsystem 712 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication subsystem 712 may operate in accordance with other wireless protocols in other embodiments. The communication subsystem 712 may include an antenna to facilitate wireless communications and/or to receive other wireless communications (such as AM or FM radio transmissions).

In some embodiments, the communication subsystem 712 may manage wired communications, such as electrical, optical, or any other suitable communication protocols (e.g., IEEE 802.3 Ethernet standards). As noted above, the communication subsystem 712 may include multiple communication components. For instance, a first communication subsystem 712 may be dedicated to shorter-range wireless communications such as Wi-Fi or Bluetooth, and a second communication subsystem 712 may be dedicated to longer-range wireless communications such as global positioning system (GPS), EDGE, GPRS, CDMA, WiMAX, LTE, EV-DO, or others. In some embodiments, a first communication subsystem 712 may be dedicated to wireless communications, and a second communication subsystem 712 may be dedicated to wired communications.

The illustrative communication subsystem 712 includes an optional network interface controller (NIC) 720, which may also be referred to as a host fabric interface (HFI). The NIC 720 may be embodied as one or more add-in-boards, daughter cards, network interface cards, controller chips, chipsets, or other devices that may be used by the compute node 700 to connect with another computing device (e.g., an edge gateway node). In some examples, the NIC 720 may be embodied as part of a system-on-a-chip (SoC) that includes one or more processors or included on a multichip package that also contains one or more processors. In some examples, the NIC 720 may include a local processor (not shown) and/or a local memory (not shown) that are both local to the NIC 716. In such examples, the local processor of the NIC 720 may be capable of performing one or more of the functions of the compute circuitry 702 described herein. Additionally, or alternatively, in such examples, the local memory of the NIC 720 may be integrated into one or more components of the client compute node at the board level, socket level, chip level, and/or other levels.

Additionally, in some examples, a respective compute node 700 may include one or more peripheral devices 714. Such peripheral devices 714 may include any type of peripheral device found in a computing device or server such as audio input devices, a display, other input/output devices, interface devices, and/or other peripheral devices, depending on the particular type of the compute node 700. In further examples, the compute node 700 may be embodied by a respective edge compute node (whether a client, gateway, or aggregation node) in an edge computing system or like forms of appliances, computers, subsystems, circuitry, or other components.

In other examples, the compute node 700 may be embodied as any type of device or collection of devices capable of performing various compute functions. Respective compute nodes 700 may be embodied as a type of device, appliance, computer, or other "thing" capable of communicating with other compute nodes that may be edge, networking, or endpoint components. For example, a compute node may be embodied as a personal computer, server, smartphone, a mobile computing device, a smart appliance, smart camera, an in-vehicle compute system (e.g., a navigation system), a weatherproof or weather-sealed computing appliance, a self-contained device within an outer case, shell, etc., or other device or system capable of performing the described functions.

Figure 8:
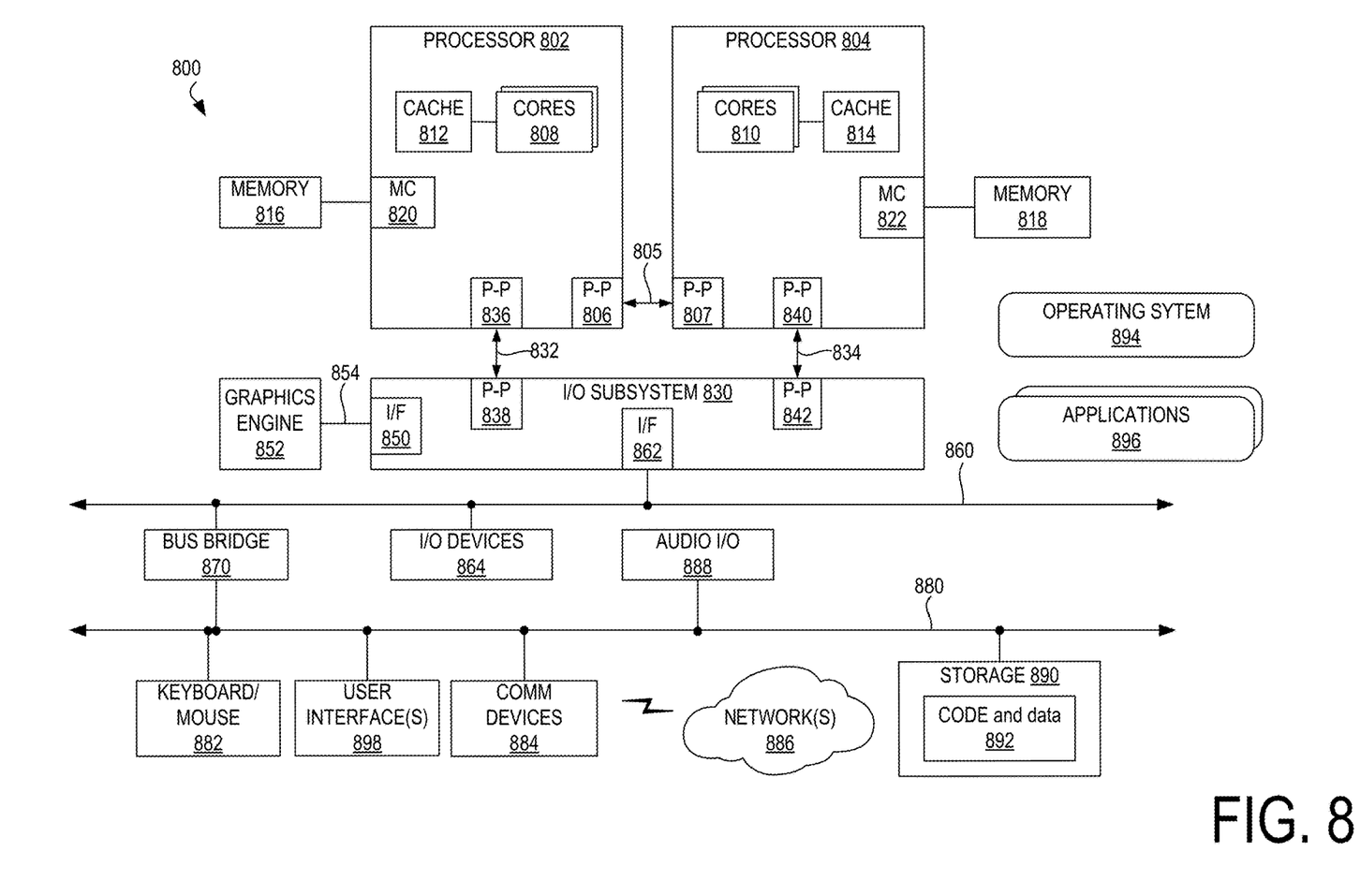
FIG. 8 illustrates a multi-processor environment in which embodiments may be implemented.

FIG. 8 illustrates a multi-processor environment in which embodiments may be implemented. Processor units 802 and 804 further comprise cache memories 812 and 814, respectively. The cache memories 812 and 814 can store data (e.g., instructions) utilized by one or more components of the processor units 802 and 804, such as the processor cores 808 and 810. The cache memories 812 and 814 can be part of a memory hierarchy for the computing system 800. For example, the cache memories 812 can locally store data that is also stored in a memory 816 to allow for faster access to the data by the processor unit 802. In some embodiments, the cache memories 812 and 814 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 800 is shown with two processor units, the computing system 800 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 800 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 802 and 804 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogencity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 802 and 804 further comprise memory controller logic (MC) 820 and 822. As shown in FIGS. 8, MCs 820 and 822 control memories 816 and 818 coupled to the processor units 802 and 804, respectively. The memories 816 and 818 can comprise various types of volatile memory (e.g., dynamic random-access memory (DRAM), static random-access memory (SRAM)) and/or non-volatile memory (e.g., flash memory, chalcogenide-based phase-change nonvolatile memories), and comprise one or more layers of the memory hierarchy of the computing system. While MCs 820 and 822 are illustrated as being integrated into the processor units 802 and 804, in alternative embodiments, the MCs can be external to a processor unit.

Processor units 802 and 804 are coupled to an Input/Output (I/O) subsystem 830 via point-to-point interconnections 832 and 834. The point-to-point interconnection 832 connects a point-to-point interface 836 of the processor unit 802 with a point-to-point interface 838 of the I/O subsystem 830, and the point-to-point interconnection 834 connects a point-to-point interface 840 of the processor unit 804 with a point-to-point interface 842 of the I/O subsystem 830. Input/Output subsystem 830 further includes an interface 850 to couple the I/O subsystem 830 to a graphics engine 852. The I/O subsystem 830 and the graphics engine 852 are coupled via a bus 854.

The Input/Output subsystem 830 is further coupled to a first bus 860 via an interface 862. The first bus 860 can be a Peripheral Component Interconnect Express (PCIe) bus or any other type of bus. Various I/O devices 864 can be coupled to the first bus 860. A bus bridge 870 can couple the first bus 860 to a second bus 880. In some embodiments, the second bus 880 can be a low pin count (LPC) bus. Various devices can be coupled to the second bus 880 including, for example, a keyboard/mouse 882, audio I/O devices 888, and a storage device 890, such as a hard disk drive, solid-state drive, or another storage device for storing computer-executable instructions (code) 892 or data. The code 892 can comprise computer-executable instructions for performing methods described herein. Additional components that can be coupled to the second bus 880 include communication device(s) 884, which can provide for communication between the computing system 800 and one or more wired or wireless networks 886 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

In embodiments where the communication devices 884 support wireless communication, the communication devices 884 can comprise wireless communication components coupled to one or more antennas to support communication between the computing system 800 and external devices. The wireless communication components can support various wireless communication protocols and technologies such as Near Field Communication (NFC), IEEE 802.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 800 can comprise removable memory such as flash memory cards (e.g., SD (Secure Digital) cards), memory sticks, Subscriber Identity Module (SIM) cards). The memory in system 800 (including caches 812 and 814, memories 816 and 818, and storage device 890) can store data and/or computer-executable instructions for executing an operating system 894 and application programs 896. Example data includes web pages, text messages, images, sound files, and video data biometric thresholds for particular users or other data sets to be sent to and/or received from one or more network servers or other devices by the system 800 via the one or more wired or wireless networks 886, or for use by the system 800. The system 800 can also have access to external memory or storage (not shown) such as external hard drives or cloud-based storage.

The operating system 894 (also simplified to "OS" herein) can control the allocation and usage of the components illustrated in FIG. 6 and support the one or more application programs 896. The application programs 896 can include common computing system applications (e.g., email applications, calendars, contact managers, web browsers, messaging applications) as well as other computing applications.

In some embodiments, a hypervisor (or virtual machine manager) operates on the operating system 894 and the application programs 896 operate within one or more virtual machines operating on the hypervisor. In these embodiments, the hypervisor is a type-2 or hosted hypervisor as it is running on the operating system 894. In other hypervisor-based embodiments, the hypervisor is a type-1 or "bare-metal" hypervisor that runs directly on the platform resources of the computing system 894 without an intervening operating system layer.

In some embodiments, the applications 896 can operate within one or more containers. A container is a running instance of a container image, which is a package of binary images for one or more of the applications 896 and any libraries, configuration settings, and any other information that one or more applications 896 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 894. An orchestrator can be responsible for management of the computing system 800 and various container-related tasks such as deploying container images to the computing system 894, monitoring the performance of deployed containers, and monitoring the utilization of the resources of the computing system 894.

The computing system 800 can support various additional input devices, represented generally as user interfaces 898, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 800. External input and output devices can communicate with the system 800 via wired or wireless connections.

In addition, one or more of the user interfaces 898 may be natural user interfaces (NUIs). For example, the operating system 894 or applications 896 can comprise speech recognition logic as part of a voice user interface that allows a user to operate the system 800 via voice commands. Further, the computing system 800 can comprise input devices and logic that allows a user to interact with computing the system 800 via body, hand, or face gestures. For example, a user's hand gestures can be detected and interpreted to provide input to a gaming application.

The I/O devices 864 can include at least one input/output port comprising physical connectors (e.g., USB, IEEE 1394

(Fire Wire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 800 can further comprise one or more additional antennas coupled to one or more additional receivers, transmitters, and/or transceivers to enable additional functions.

In addition to those already discussed, integrated circuit components, integrated circuit constituent components, and other components in the computing system 894 can communicate with interconnect technologies such as Intel® QuickPath Interconnect (QPI), Intel® Ultra Path Interconnect (UPI), Computer Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 894 may utilize more or more interconnect technologies.

It is to be understood that FIG. 8 illustrates only one example computing system architecture. Computing systems based on alternative architectures can be used to implement technologies described herein. For example, instead of the processors 802 and 804 and the graphics engine 852 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 8. Moreover, the illustrated components in FIG. 8 are not required or all-inclusive, as shown components can be removed and other components added in alternative embodiments.

Figure 9:
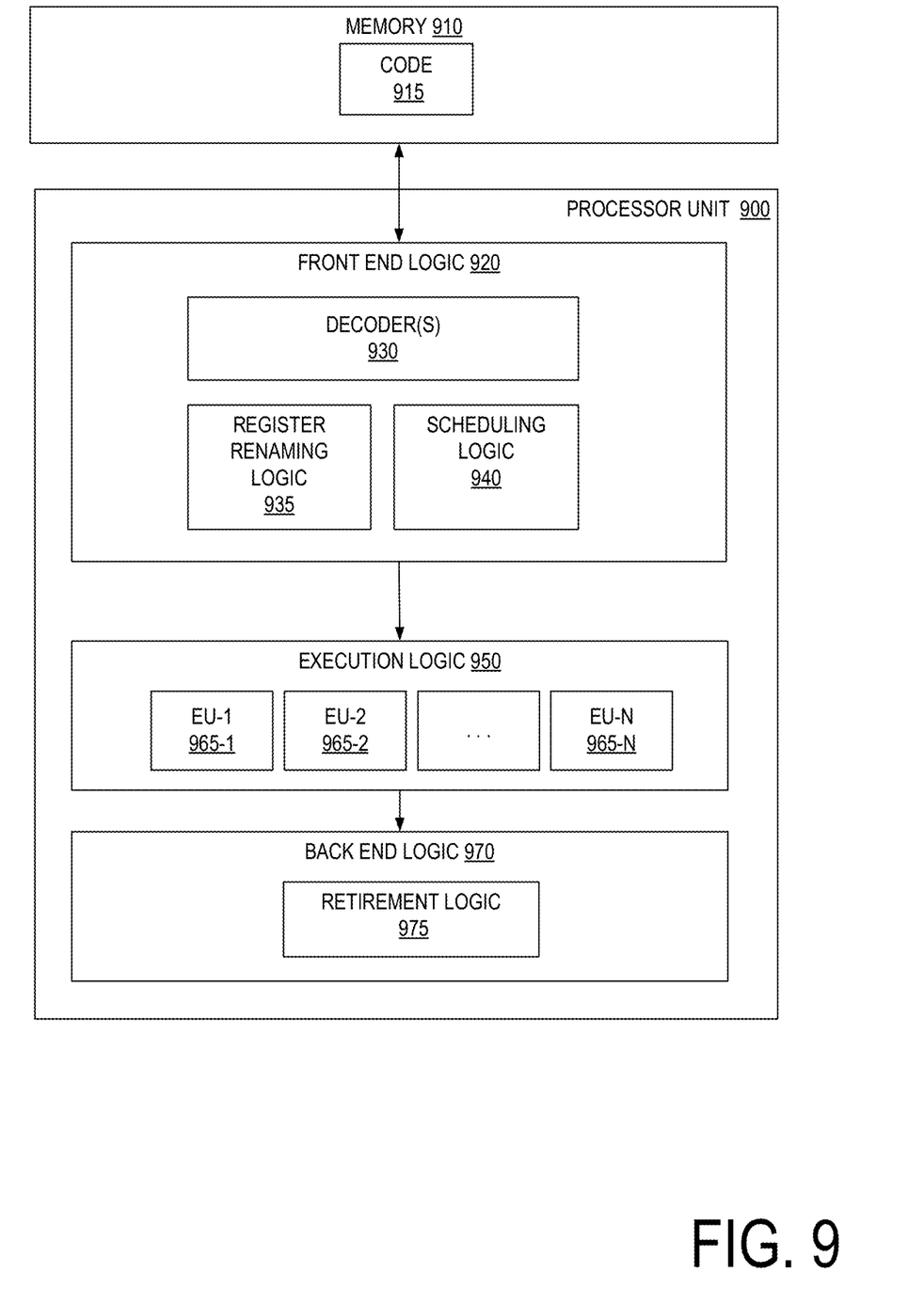
FIG. 9 is a block diagram of an example processor unit to execute computer-executable instructions as part of implementing technologies described herein.

FIG. 9 is a block diagram of an example processor unit 900 to execute computer-executable instructions as part of implementing technologies described herein. The processor unit 900 can be a single-threaded core or a multithreaded core in that it may include more than one hardware thread context (or "logical processor") per processor unit.

FIG. 9 also illustrates a memory 910 coupled to the processor unit 900. The memory 910 can be any memory described herein or any other memory known to those of skill in the art. The memory 910 can store computer-executable instructions 915 (code) executable by the processor unit 900.

The processor unit comprises front-end logic 920 that receives instructions from the memory 910. An instruction can be processed by one or more decoders 930. The decoder 930 can generate as its output a micro-operation such as a fixed width micro-operation in a predefined format, or generate other instructions, microinstructions, or control signals, which reflect the original code instruction. The front-end logic 920 further comprises register renaming logic 935 and scheduling logic 940, which generally allocate resources and queues operations corresponding to converting an instruction for execution.

The processor unit 900 further comprises execution logic 950, which comprises one or more execution units (EUs) 965-1 through 965-N. Some processor unit embodiments can include a few execution units dedicated to specific functions or sets of functions. Other embodiments can include only one execution unit or one execution unit that can perform a particular function. The execution logic 950 performs the operations specified by code instructions. After completion of execution of the operations specified by the code instructions, back-end logic 970 retires instructions using retirement logic 975. In some embodiments, the processor unit 900 allows out of order execution but requires in-order retirement of instructions. Retirement logic 975 can take a variety of forms as known to those of skill in the art (e.g., re-order buffers or the like).

The processor unit 900 is transformed during execution of instructions, at least in terms of the output generated by the decoder 930, hardware registers and tables utilized by the register renaming logic 935, and any registers (not shown) modified by the execution logic 950.

While at least one embodiment has been presented in the foregoing detailed description, it should be appreciated that a vast number of variations exist. It should also be appreciated that the disclosed embodiments are only examples, and are not intended to limit the scope, applicability, or configuration of the disclosure in any way. Rather, the foregoing detailed description will provide those skilled in the art with a convenient road map for implementing the disclosed aspects of the present disclosure. Various changes can be made in the function and arrangement of elements without departing from the scope of the disclosure as set forth in the appended claims and the legal equivalents thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

Additionally, theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

As used herein, phrases such as "embodiments," "an aspect of the present disclosure," "various aspects of the present disclosure," "some aspects of the present disclosure," and the like, indicate that some aspects of the present disclosure may have some, all, or none of the features described for other aspects of the present disclosure. "First," "second," "third," and the like describe a common object and indicate different instances of like objects being referred to; unless specifically stated, they do not imply a given sequence, either temporally or spatially, in ranking, or any other manner. In accordance with patent application parlance, "connected" indicates elements that are in direct physical or electrical contact with each other and "coupled" indicates elements that co-operate or interact with each other, coupled elements may or may not be in direct physical or electrical contact. Furthermore, the terms "comprising," "including," "having," and the like, are utilized synonymously to denote non-exclusive inclusions.

As used in this application and the claims, a list of items joined by the term "at least one of" can mean any combination of the listed terms. For example, the phrase "at least one of A, B and C" can mean A; B; C; A and B; A and C; B and C; or A, B, and C. Similarly, as used in this application and the claims, a list of items joined by the term "one or more of" can mean any combination of the listed terms. For example, the phrase "one or more of A, B and C" can mean A; B; C; A and B; A and C; B and C; or A, B, and C.

The following Examples pertain to additional aspects of the present disclosure of technologies disclosed herein.

Example 1 is an apparatus, comprising: a housing comprising an upper cover attached to a lower cover, wherein the lower cover includes a plurality of through-holes; a motherboard located within the housing and positioned over a first subset of the plurality of through-holes; a fan assembly located within the housing and positioned over a second subset of the plurality of through-holes, wherein the fan assembly is configured to pull ambient air into the housing and push air across the motherboard; and a heat exchange component located on the lower cover in the housing, the heat exchange component configured to occlude the first subset of the plurality of through-holes.

Example 2 includes the subject matter of Example 1, wherein the fan assembly is further configured to pressurize the air before pushing the air across the motherboard.

Example 3 includes the subject matter of Example 1 or Example 2, wherein the heat exchange component includes a heat exchange portion configured to partially fill a respective through-hole.

Example 4 includes the subject matter of Example 3, wherein the heat exchange component comprises a plurality of fins located around a perimeter of a through-hole.

Example 5 includes the subject matter of Example 3, wherein the heat exchange component comprises a plurality of fins across a width of a through-hole.

Example 6 includes the subject matter of Example 3, wherein the heat exchange component comprises a beveled shape defined by substantially planar peaks followed by substantially planar troughs.

Example 7 includes the subject matter of any one of Examples 1-6, wherein the fan assembly is located in a pressurized compartment in the housing.

Example 8 includes the subject matter of any one of Examples 1-7, wherein the heat exchange component comprises a thermally conductive material.

Example 9 includes the subject matter of any one of Examples 1-8, wherein the heat exchange component comprises copper with a thickness of about 0.1 millimeter.

Example 10 includes the subject matter of any one of Examples 1-8, wherein the motherboard includes at least one heat generating component.

Example 11 includes the subject matter of any one of Examples 1-10, wherein the upper cover comprises a C cover and the lower cover comprises a D cover.

Example 12 is a device, comprising: a housing comprising a C cover attached to a D cover, wherein the C cover includes a keyboard and the D cover includes an arrangement of a plurality of through-holes; a motherboard located within the housing and positioned over a first portion of the arrangement, wherein the motherboard has a central processing unit (CPU) attached thereto; a fan assembly located within the housing and positioned over a second portion of the arrangement, wherein the fan assembly is configured to pull ambient air into the housing and push air across the motherboard; and a heat exchange component overlaid on the D cover, inside the housing, the heat exchange component configured to occlude the first portion of the arrangement.

Example 13 includes the subject matter of Example 12, further comprising a display operationally attached to the housing.

Example 13 includes the subject matter of Example 12, wherein the fan assembly is further configured to pressurize the air before pushing the air across the motherboard.

Example 14 includes the subject matter of Example 12, wherein the heat exchange component includes a heat exchange portion configured to partially fill a respective through-hole.

Example 15 includes the subject matter of Example 15, wherein the heat exchange component comprises a plurality of fins located around a perimeter of a through-hole.

Example 16 includes the subject matter of Example 15, wherein the heat exchange component comprises a plurality of fins across a width of a through-hole.

Example 17 includes the subject matter of Example 15, wherein the heat exchange component comprises a beveled shape defined by substantially planar peaks followed by substantially planar troughs.

Example 18 includes the subject matter of Example 12, wherein the fan assembly is located in a pressurized compartment in the housing.

Example 19 includes the subject matter of Example 12 wherein the heat exchange component comprises copper with a thickness of about 0.1 millimeter.

Example 20 is an apparatus including a housing comprising an upper cover attached to a lower cover, wherein the lower cover includes a plurality of through-holes; a motherboard located within the housing and positioned over a first subset of the plurality of through-holes; a fan assembly located within the housing and positioned over a second subset of the plurality of through-holes, wherein the fan assembly is configured to pull ambient air into the housing and push air across the motherboard; and a means for heat exchange located on the lower cover in the housing, the means for heat exchange configured to occlude the first subset of the plurality of through-holes.

Example 21 includes the subject matter of Example 20, wherein the means for heat exchange includes a textured region for a through-hole.

What is claimed is:

1. An apparatus, comprising:
a housing comprising an upper cover attached to a lower cover, wherein the lower cover includes a plurality of through-holes;
a motherboard located within the housing and positioned over and extending across a first subset of the plurality of through-holes;
a fan assembly located within the housing and positioned over a second subset of the plurality of through-holes, wherein the fan assembly is configured to pull ambient air into the housing and push air across the motherboard; and
a heat exchange component located on the lower cover in the housing, wherein the heat exchange component includes a heat exchange portion configured to partially fill a respective through-hole, the heat exchange component configured to occlude the first subset of the plurality of through-holes.

2. The apparatus of claim 1, wherein the fan assembly is further configured to pressurize the air before pushing the air across the motherboard.

3. The apparatus of claim 1, wherein the heat exchange component comprises a plurality of fins located around a perimeter of a through-hole.

4. The apparatus of claim 1, wherein the heat exchange component comprises a plurality of fins across a width of a through-hole.

5. The apparatus of claim 1, wherein the heat exchange component comprises a beveled shape defined by substantially planar peaks followed by substantially planar troughs.

6. The apparatus of claim 1, wherein the fan assembly is located in a pressurized compartment in the housing.

7. The apparatus of claim 1, wherein the heat exchange component comprises a thermally conductive material.

8. The apparatus of claim 1, wherein the heat exchange component comprises copper with a thickness of about 0.1 millimeter.

9. The apparatus of claim 1, wherein the motherboard includes at least one heat generating component.

10. The apparatus of claim 1, wherein the upper cover comprises a C cover and the lower cover comprises a D cover.

11. A device, comprising:
a housing comprising a C cover attached to a D cover, wherein the C cover includes a keyboard, and the D cover includes an arrangement of a plurality of through-holes;
a motherboard located within the housing and positioned over a first portion of the arrangement, wherein the motherboard has a central processing unit (CPU) attached thereto;
a fan assembly located within the housing and positioned over a second portion of the arrangement, wherein the fan assembly is configured to pull ambient air into the housing and push air across the motherboard; and
a heat exchange component overlaid on an internal surface portion of the D cover, inside the housing, wherein the internal surface portion includes the first portion of the arrangement, wherein the heat exchange component includes a heat exchange portion configured to partially fill a respective through-hole, wherein the heat exchange component is configured to occlude the first portion of the arrangement.

12. The device of claim 11, wherein the fan assembly is further configured to pressurize the air before pushing the air across the motherboard.

13. The device of claim 11, wherein the heat exchange component comprises a plurality of fins located around a perimeter of a through-hole.

14. The device of claim 11, wherein the heat exchange component comprises a plurality of fins across a width of a through-hole.

15. The device of claim 11, wherein the heat exchange component comprises a textured area for a through-hole.

16. The device of claim 11, wherein the fan assembly is located in a pressurized compartment in the housing.

17. An apparatus, comprising:
a housing comprising an upper cover attached to a lower cover, wherein the lower cover includes a plurality of through-holes;
a motherboard located within the housing and positioned over a first subset of the plurality of through-holes;
a fan assembly located within the housing and positioned over a second subset of the plurality of through-holes, wherein the fan assembly is configured to pull ambient air into the housing and push air across the motherboard; and
a means for heat exchange located on the lower cover in the housing, wherein the means for heat exchange includes a textured region for a through-hole, the means for heat exchange configured to occlude the first subset of the plurality of through-holes.

18. The apparatus of claim 17, wherein the means for heat exchange includes a heat exchange portion configured to partially fill a respective through-hole.

19. The apparatus of claim 17, wherein the upper cover comprises a C cover and the lower cover comprises a D cover.

20. The apparatus of claim 17, wherein the means for heat exchange comprises a thermally conductive material.

* * * * *